United States Patent [19]

Charuau

[11] Patent Number: 4,496,837

[45] Date of Patent: Jan. 29, 1985

[54] PRESSURE REDUCING DEVICE

[75] Inventor: Jean Charuau, Orsay, France

[73] Assignee: Commissariat a l'Energie Atomique, Paris, France

[21] Appl. No.: 399,263

[22] Filed: Jul. 19, 1982

[30] Foreign Application Priority Data

Jul. 24, 1981 [FR] France ................ 81 14430

[51] Int. Cl.³ .................. G01T 1/161; G01T 1/18
[52] U.S. Cl. ..................... 250/303; 250/288; 250/380; 250/385
[58] Field of Search ........... 250/303, 379, 380, 385, 250/288

[56] References Cited

U.S. PATENT DOCUMENTS

| | | | |
|---|---|---|---|
| 2,653,620 | 9/1953 | Morgan | 250/288 |
| 2,721,270 | 10/1955 | Bennett | 250/288 |
| 2,775,707 | 12/1956 | Benapfl | 250/288 |
| 3,130,920 | 4/1964 | Devillard | |

FOREIGN PATENT DOCUMENTS 2064105  6/1981  United Kingdom .

OTHER PUBLICATIONS

*Van Nostrand's Scientific Encyclopedia*, Fifth Ed., 1976, p. 1069.

*Primary Examiner*—Bruce C. Anderson
*Attorney, Agent, or Firm*—Oblon, Fisher, Spivak, McClelland & Maier

[57] ABSTRACT

The present invention relates to a pressure reducing device and to an apparatus for detecting aerosols and particularly aerosols of solid particles emitting $\alpha$ rays. This apparatus comprises a measuring chamber equipped with a sampling filter and a radiation detector and linked with the outside by an inlet pipe and an outlet pipe. The inlet pipe is equipped with a venturi tube making it possible to produce a pressure reduction in the measuring chamber and exert on the solid particles of the aerosol fluid flow forces exceeding the forces tending to make these particles adhere to the walls. Application to the detection of $\alpha$ radiation emitting aerosols.

7 Claims, 3 Drawing Figures

PRESSURE REDUCING DEVICE

BACKGROUND OF THE INVENTION

The present invention relates to a pressure reducing device able to produce a pressure drop in an aerosol, as well as to an apparatus for the detection of aerosols and particularly aerosols of solid α-ray emitting particles using such a device.

It more specifically relates to an apparatus for the detection of aerosols, equipped with a pressure reducing device making it possible to produce a pressure drop in the measuring chamber, while ensuring the reentrainment of the particles, which might be deposited on the walls of the pressure reducing device.

In general, α-ray emitting particle aerosols are detected on the basis of their being sampled on a filter. The latter is placed in a sealed chamber and faces the sensitive surface of a detector. Between the two surfaces a distance x is necessary for permitting the flow of air containing the aerosols without polluting the measuring head and for obtaining a homogeneous sample on the filter. However, when the distance x increases, the accuracy of the measurement decreases and the resolution of the detector becomes poor. It is then difficult to differentiate the measurement of the contaminants of a given energy (e.g. plutonium 238 and 239 isotopes) from that of other α-emitters constituting a background noise (e.g. solid daughter nuclei of radon, such as RaA and RaC'). Therefore an optimum distance is defined, which ensures that the flow of the aerosol and the performances of the measurement are satisfactory.

However, for a given source-detector distance, the resolution of the apparatus can be improved by introducing the aerosol into the measuring chamber at a pressure below atmospheric pressure.

Equipment exists, where the pipe for introducing the aerosol into the measuring chamber is equipped with a device able to introduce a pressure drop into the circuit, e.g. a valve with a regulatable throttle or constriction, thereby reducing the pressure in the measuring chamber.

However, even such a device has disadvantages, because a by no means negligible fraction of the aerosol particles can be retained in the pressure reducing device by adhering to its walls. The retained fraction, which varies with the size of the particles and with the flow rate, can reach 50% in the case of particles with a diameter greater than 1 μm. Thus, the grain size distribution of the particles deposited on the filter is no longer representative of the aerosol, which falsifies the measurements.

BRIEF SUMMARY OF THE INVENTION

The problem of the present invention is a pressure reducing device, which eliminates these disadvantages by preventing the risk of aerosol particles being deposited on the walls.

According to the main feature of the pressure reducing device according to the invention, the latter comprises a venturi tube making it possible to exert on the aerosol particles a fluid flow force exceeding the force which tends to make them adhere to the walls of the venturi tube.

The invention also relates to an aerosol detection apparatus using such a device.

According to the main feature of the apparatus, the apparatus, which is of the type having a measuring chamber equipped with a sampling filter and a radiation detector and which is linked with the outside by an inlet and an outlet pipe, it includes a venturi tube in the inlet pipe making it possible to produce a pressure drop in the measuring chamber and exert on the solid particles of the aerosol a fluid flow force which exceeds the force tending to make them adhere to the walls.

Through placing a venturi tube upstream of the measuring chamber, it is possible to easily obtain in the tube a flow speed close to that of sound, while prevents the deposition of large particles on the tube walls, because under these conditions the fluid flow force of the particles exceeds the adhesive force therefor to the walls.

According to another feature of the apparatus, the angle at the apex of the convergent portion of the venturi tube is below 30° and the angle at the apex of the divergent portion thereof below 10°.

According to another feature of the apparatus, the neck of the venturi tube and the whole divergent portion are made in one piece without any connection, so as not to destroy the boundary layer of the turbulent flow.

According to another feature of the aerosol detection apparatus according to the invention, the internal walls of the different elements of the venturi tube are smooth and made from an electrically conducting material.

Finally, according to a final feature of the apparatus, and relating to a use in the presence of oils or similar substances, the inner walls of the different elements of the venturi tube are covered with a surfactant, which is preferably a fluorine-containing product.

An excellent surface state of the divergent portion is a prerequisite for the satisfactory operation of the device. This also requires electrically conducting walls in order to permit the flow of parasitic electric charges, which would bring about the deposition of charged particles by electrostatic attraction. The wall must be metallic or covered with a conductive material.

Moreover, the walls must not be polluted by any droplets of oil or other liquids which may have been accidentally sucked in and which would considerably increase the adhesive forces of the aerosols traversing the device. To minimize this disadvantage, the wall can advantageously be coated with a dry film of a surfactant, whose low surface energy brings about a good repulsion with respect to aqueous solutions and oils and prevents the migration of droplets to the wall. Thus, measurements carried out under a microscope have shown, for example, that in dioctyl phthalate (DOP) oil droplet of 10 μm, a spreading coefficient is reduced to approximately 1.5. Such a covering can also prevent the formation of a liquid film absorbed by the wall during sampling in a water vapour-saturated atmosphere. This phenomenon, which occurs in the case of relative humidity levels exceeding 70%, increases the adhesion of particles, which are then exposed to capillary forces. Due to the very high flow rate of the aerosol, the gas undergoes a temperature drop level with the neck of the venturi tube, which increases the risk of this phenomenon appearing.

Another advantage of the presence of such a surfactant is that, by considerably reducing the adhesion of droplets and consequently facilitating their entrainment, a supplementary guarantee is provided with regards to the maintaining of the satisfactory state of the wall surface. However, the way in which the surfactant is applied must be such that the deposited coating is thin and perfectly uniform.

Among the surfactants which can be used according to the invention, the most effective are fluoric or fluorine-containing agents. The standard method of application consists of impregnating the device in a solution of such a product and then allowing the solvent to evaporate. A dry film of approximate thickness $1\mu$ is then formed on the wall and this film is insoluble in fluoric solvents and is able to withstand temperatures up to about 200° C. Moreover, this coating has a good mechanical behavior and does not significantly modify the electrical conductivity properties of the wall.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
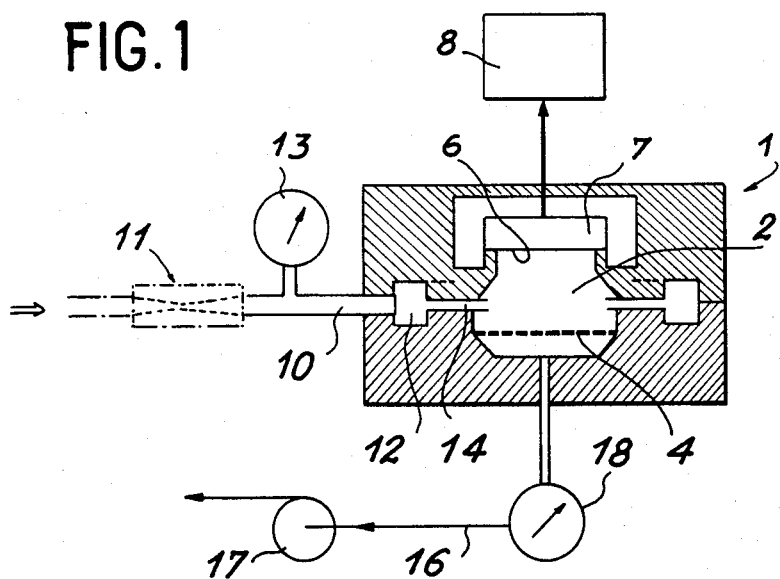
FIG. 1 is a diagrammatic sectional view of a detection apparatus according to the invention.

FIG. 1 shows an $\alpha$-particle emitting aerosol detection apparatus 1 comprising a measuring chamber 2 containing a sampling filter 4 facing the sensitive surface 6 of a detector 7, which is itself connected to a measuring apparatus 8. The aerosol arrives by a pipe 10 issuing into an annular space 12 surrounding chamber 2. Radial passages 14 connect space 12 with the latter. The aerosol particles are retained by filter 4, while the gas is discharged by pipe 16. The latter is provided with a suction pump 17 and a flowmeter 18.

In order to produce a pressure reduction in the measuring chamber, a pressure reducing device 11 able to introduce a pressure drop in the flow is placed on inlet pipe 10. A pressure gauge 13, located between device 11 and chamber 2, indicates the pressure within the latter.

Figure 2:
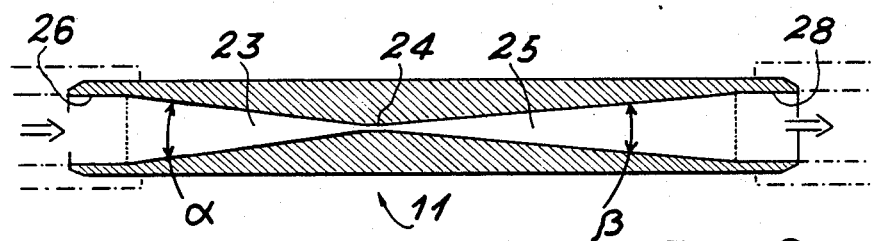
FIG. 2 is a larger scale sectional view of the venturi tube used in the apparatus according to the invention.

The pressure reducing device used in the detection apparatus according to the invention is shown in greater detail in FIG. 2. It is possible to see that it is a venturi tube having on the upstream side a cylindrical inlet connection 26 and on the downstream side a cylindrical outlet connection 28. This venturi tube also comprises a convergent portion 23 with an apex angle $\alpha$, followed by a central cylindrical portion or neck 24, whose length is equal to the diameter and a divergent portion with an apex angle $\beta$. The neck diameter is calculated so as to obtain the desired flow rate, when the air speed traversing it is the speed of sound. In order to prevent any detachment of the flow lines; the dimensions of the venturi tube are calculated in such a way that the angle $\alpha$ is below 30° and the angle $\beta$ is below 10°. The neck and the divergent portion must be produced in one piece. A device of this type has been produced in which the angle $\alpha$ is 21° and the angle $\beta$ is 7°. The inlet and outlet connections have a diameter of 6 mm, while the length and diameter of neck 24 are 2 mm.

Experiments have been carried out on this device using different aerosols, each containing particles with a homogeneous grain size in order to determine the fraction of the particles retained as a function of the flow rate and the diameter thereof. For this purpose monodispersed aerosols of fluorescein ammonium salts have been used having a diameter of 2.0, 4.1, 6.1 and 9.0 $\mu$m respectively.

The test bench used for the experiments firstly comprises a particle generator operating on the principle of the controlled fragmentation of a cylindrical liquid jet. The jet is fragmented by a ceramic alcohol. After evaporating the solvent, solid particles are left behind and their size is a function of the concentration of the solution. Although this production procedure makes it possible to obtain a homogeneous grain size distribution, it has the disadvantage of causing a high electrical charge of the particles, the latter being neutralized by means of a krypton $85\beta^-$ source. The particles then reach the pressure reducing device according to the invention through a connection cone and a connecting cylindrical tube preceding the inlet of the device and having the same diameter as the latter. The length of the connecting tube is equal to 20 times its diameter while another cylindrical tube is provided which extends the outlet connection of the device and has the same diameter as said outlet connection and a length which is 20 times this diameter. Finally, another conical connection permits the particles to reach a sampling filter. The latter is made from fiberglass, while the complete aerosol flow circuit, including the device according to the invention, is entirely of metal (brass) and connected to earth.

The aerosols pass through the device for a time which varies as a function of the size of the particles and the chosen flow rate. Once the test is ended, the pressure reducing device and the sampling filter are impregnated in an ammoniated soft water solution. The fluorescein ammonium salt concentration of the solutions is measured by means of a fluorimeter with a xenon lamp, which gives information as to the mass of particles deposited respectively on the filter and the device.

The results for different particle flow rates and diameters are given in the attached table. It can be seen that for small particles of $2\mu$, the fraction retained is approximately 1 to 2%, no matter what the flow rate and pressure conditions.

Figure 3:
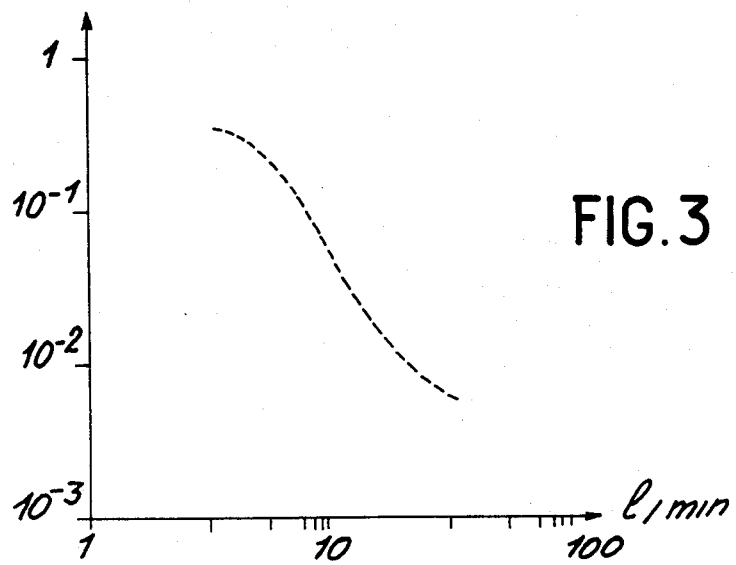
FIG. 3 is a curve showing in logarithmic scale and as a function of the flow in liters/minute, the fraction of particles retained in the venturi tube in the case of particles with a diameter of $6.1\mu$.

However, in the case of larger particles, deposition is much greater for a low flow rate. In the curve of FIG. 3, corresponding to particles of diameter 6.1 $\mu$m, it can be seen that there is a very considerable deposition (30% for a low flow rate of 4.4 l/min). When the flow rate increases, the deposited fraction decreases to reach 1% at 20 l/min and drops to 0.4% on reaching the maximum flow rate of 32.8 l/min (this value corresponding to the maximum possible flow rate which is automatically regulated, due to the fact that the device used for the tests operated in the sonic range). Examination of the table of results shows that at this maximum flow rate of 32.8 l/min., the retained fraction is smaller for the largest particles. Complementary measurements carried out at the end of the experiment revealed that the deposition of particles on the connection tubes and cones located upstream and downstream of the device are low and do not lead to significant errors on the results given hereinbefore.

Thus, the device according to the invention has particularly interesting advantages, because it makes it possible to produce a pressure drop in the measuring chamber of an $\alpha$ particle emitting aerosol detector, while reducing to a value below 2% the fraction of particles retained in the pressure reducing device, no matter what the size thereof. This prevents measuring errors due to a variation in the grain size of the particles entering the chamber. The latter result is obtained as from a certain suction flow rate value, which is in any case necessary for obtaining the pressure drop.

It is obvious that the invention is not limited to the embodiment described hereinbefore, and various modifications are possible without passing beyond the scope of the invention. Thus, the Expert could adapt the dimensions of the different elements of the device (diameter of the inlet and outlet connections, angle at the apex of the convergent and divergent portions of the venturi tube) as a function of the diameter of the particles and the desired flow rate.

Moreover, although an example in which the pressure reducing device was associated with an aerosol detection apparatus has been specifically described, such a device can obviously be associated with other apparatus types and can be used in all applications where it is necessary to produce a pressure drop in an aerosol flow and where it is wished to prevent the deposition of particles of the aerosol on the walls of the pressure reducing device.

TABLE

CONDITIONS AND RESULTS OF RETENTION MEASUREMENTS FOR MONODISPERSED AEROSOLS

| Diameter of particles $\mu m$ | Air flow rate $l/min^{-1}$ | Flow on passing through the venturi neck | | Pressure drop $\Delta p$, mbar | Fraction retained |
|---|---|---|---|---|---|
| | | speed $m \cdot s^{-1}$ | Reynolds number | | |
| 2.0 | 6.8 | 37 | 4,390 | 5.5 | $1.75 \cdot 10^{-2}$ |
| — | 32.8 | 260 | 23,570 | 500 | $1.29 \cdot 10^{-2}$ |
| 4.1 | 6.8 | 37 | 4,930 | 5.5 | $22.3 \cdot 10^{-2}$ |
| — | 32.8 | 260 | 23,570 | 500 | $0.87 \cdot 10^{-2}$ |
| 6.1 | 4.4 | 24 | 3,200 | 2.9 | $28.6 \cdot 10^{-2}$ |
| — | 6.8 | 37 | 4,930 | 5.5 | $22.0 \cdot 10^{-2}$ |
| — | 6.8 | 37 | 4,930 | 5.5 | $16.1 \cdot 10^{-2}$ |
| — | 10.5 | 58 | 7,730 | 12.5 | $4.0 \cdot 10^{-2}$ |
| — | 15.0 | 85 | 10,770 | 24.0 | $1.9 \cdot 10^{-2}$ |
| — | 20.4 | 122 | 14,640 | 49.5 | $1.1 \cdot 10^{-2}$ |
| — | 28.0 | 188 | 20,050 | 100 | $0.22 \cdot 10^{-2}$ |
| — | 32.8 | 260 | 23,570 | 500 | $0.43 \cdot 10^{-2}$ |
| 9.0 | 4.4 | 24 | 3,200 | 2.9 | $19.0 \cdot 10^{-2}$ |
| — | 6.8 | 37 | 4,930 | 5.5 | $8.6 \cdot 10^{-2}$ |
| — | 32.8 | 260 | 23,570 | 500 | $0.23 \cdot 10^{-2}$ |

What is claimed is:

1. An apparatus for detecting an aerosol for α-ray emitting solid particles, comprising:
   means defining a measuring chamber;
   a sampling filter in said measuring chamber;
   a radiation detector in said measuring chamber;
   outlet means communicating with said measuring chamber;
   an aerosol source;
   inlet means communicating said aerosol source with said measuring chamber;
   a venturi tube in said inlet means; and
   means for causing said aerosol to flow through said venturi tube at or near the speed of sound, whereby a fluid flow force of said aerosol reduces adherence of particles of said aerosol on walls of said venturi tube.

2. An apparatus according to claim 1, wherein the venturi tube includes a convergent portion having an apex angle below 30°, a central cylindrical portion, whose length is equal to a diameter thereof and a divergent portion having an apex angle below 10° C.

3. An apparatus according to claim 2, wherein the apex angle of the convergent portion of the venturi tube is 21° and the apex angle of the divergent portion 7°.

4. An apparatus according to claim 1, wherein the inner walls of the venturi tube are made from an electrically conducting material.

5. An apparatus according to claim 1, wherein the neck and the divergent portion of the venturi tube are unitary, without any connection.

6. An apparatus according to claim 1, wherein the inner walls of the venturi tube are covered by a surfactant.

7. An apparatus according to claim 6, wherein the surfactant is a fluorine-containing product.

* * * * *